2,865,965
CHEMICAL PROCESS

Paul D. May, Galveston, John A. Ridgway, Jr., Texas City, and Francis T. Wadsworth, Dickinson, Tex., assignors to The American Oil Company, Texas City, Tex., a corporation of Texas No Drawing. Application February 26, 1957
Serial No. 642,338

10 Claims. (Cl. 260—609)

This invention relates to improvements in the free radical catalyzed reaction of hydrogen sulfide with hydrocarbons containing an olefinic linkage, and in particular it concerns methods for promoting the reaction. This application is a continuation-in-part of our Serial No. 568,200, filed February 28, 1956, now abandoned.

The reaction of hydrogen sulfide with hydrocarbons containing an olefinic linkage in the presence of free radical catalysts is the subject of many publications and patents. The process is generally characterized by incomplete conversion and low yields of desired products. Even though the free radical catalyzed reaction of hydrogen sulfide with alpha-olefins produces primary mercaptans directly, the poor yields and the production of byproducts has been such that manufacturers have resorted to indirect synthesis routes, e. g. the synthesis of primary mercaptans from chlorinated hydrocarbons.

An object of this invention is to provide a method for obtaining faster reaction rates and more complete conversion in the free radical catalyzed reaction of hydrogen sulfide with hydrocarbons containing an olefinic linkage. Another object is to provide a process which is more selective for producing mercaptan compounds in preference to organic sulfides. A further object is to provide a process for producing primary mercaptans from alpha-olefins and hydrogen sulfide at high rates of reaction with improved yields and higher ratios of primary mercaptan to sulfide in the product. Other advantages and benefits will be apparent from the more detailed description of the invention.

It has been discovered that these and other objects can be attained by carrying out the free radical catalyzed reaction of hydrogen sulfide with a hydrocarbon having an olefinic linkage in the presence of a promoter consisting of water. Additional benefits are obtained if the water has a pH of less than 7, e. g. pH of 1–3.

The present invention is limited to free radical catalyzed reactions of hydrogen sulfide with hydrocarbons having an olefinic linkage as distinct from acid catalyzed reactions. In the acid or ionic catalyzed reaction, hydrogen sulfide addition across the olefinic linkage takes places in accordance with the Markownikoff rule, i. e. "normal" addition in which the sulfhydryl radical attaches to the unsaturated carbon atom having the lesser number of hydrogen atoms attached thereto. In the free radical catalyzed reaction, "abnormal" addition or contra-Markownikoff addition takes place, i. e. the sulfhydryl radical attaches to the unsaturated carbon atom having the most hydrogen atoms attached thereto. For example, when an alpha-olefin is reacted with hydrogen sulfide under acid catalyzed conditions, a secondary mercaptan, viz. 2-thiol is formed; whereas in the free radical catalyzed reaction, the alpha-olefin is converted to a primary mercaptan, viz. the 1-thiol.

Any of the free radical catalytic agents heretofore used in catalyzing the reaction between hydrogen sulfide and hydrocarbons having an olefinic linkage may be used in the practice of this invention. For example, peroxide compounds, organic azo compounds, ultraviolet radiations of below 3,000 Angstrom units, etc. can be employed. While di-tertiaryalkyl peroxides such as di-tertiarybutyl peroxides are highly effective free radical catalysts for this reaction, the other dialkyl peroxides, alkyl hydro peroxides, alkyl peroxy esters, diacyl peroxides, which are effective catalysts for this reaction may be utilized. The peroxide free radical catalysts are, of course, employed at temperatures at which the peroxide decomposes to form free radicals, the particular optimum temperature used varying to some extent with the different peroxides employed. For example, with di-tertiarybutyl peroxide, reaction temperatures of from 100 to 150° C. or thereabouts, e. g. 125° C., with pressures of 100–2500 p. s. i. g. and reaction times of 0.5 to 25 hours can be employed. Likewise the various azo catalysts which cause this reaction to occur via a free radical mechanism may be used. For instance the azo catalysts which have an acyclic azo group, —N=N—, bonded to different non-aromatics, i. e. aliphatic or cycloaliphatic carbons, at least one of which is tertiary can be used. Such compounds and their use for catalyzing the free radical addition of hydrogen sulfide to olefinic linkages is described in U. S. 2,551,813. As an example, alpha,alpha'-azodiisobutyronitrile can be used in catalyzing the free radical reaction of hydrogen sulfide with an olefinic hydrocarbon, and when water is added to the reaction zone (which may conveniently be maintained at a temperature of 40–150° C., while using reaction times of from .1 to 24 hours and pressures of 100–2500 p. s. i. g.) the extent of conversion is increased and better yields of primary mercaptan are obtained than if no water were present. Another source of free radicals are those induced by subjecting the reactants to ultraviolet radiations of below about 3,000 Angstrom units, e. g. 2,900 Angstrom units at temperatures of from about 5 to about 25° C. U. S. 2,398,479 describes a process using ultraviolet rays of the defined wave length for the free radical catalyzed reaction of hydrogen sulfide with olefinic hydrocarbons. It must, of course, be remembered that in all instances the invention employs liquid water in the reaction zone and therefore temperatures above the freezing point of the water must be used.

The hydrogen sulfide used is preferably high purity hydrogen sulfide and should be free of compounds which inhibit the chain reaction mechanism which occurs in free radical catalysis. Oxygen should be excluded from the system. Impure byproduct hydrogen sulfide streams (e. g. the byproduct hydrogen sulfide streams produced from Girbitol units often employed by petroleum refiners and which may contain 15 or 20% of contaminants such as hydrocarbon gases, hydrogen, water vapor, etc. and which water vapor may constitute a portion or all of the water needed in the practice of this invention) may be used provided they are free of materials which inhibit or stop the free radical mechanism. To maximize the formation of mercaptans and minimize the formation of thioethers, ratios of hydrogen sulfide to hydrocarbon of at least one or greater, e. g. 1–10 mols H₂S/mol of hydrocarbon should be used, the higher the mol ratio the higher is the molar ratio of mercaptan to thioether in the product.

In carrying out the invention, a hydrocarbon which has an olefinic linkage is used. It may contain one or more olefinic linkages, thus, for example, it may be 1,3-butadiene, isoprene, etc. It must contain an olefinic linkage in an aliphatic or cycloaliphatic grouping as distinct from the unsaturated linkage in an aromatic molecule such as benzene. The carbon atoms having the olefinic linkage may have attached thereto an alkyl, cycloalkyl, aryl, or other hydrocarbon substituent. The invention is particularly useful for manufacturing primary mercaptans from those hydrocarbons which have their olefinic linkage at a terminal carbon atom, e. g. alpha-olefins. For example, aliphatic olefins such as straight chain alpha-olefins having from 2 to 20 carbon atoms can be converted in high yields to straight chain primary mercaptans. Thus, ethylene, propylene, butene-1, pentene-1, hexene-1, octene-1, dodecene-1, hexadecene-1, etc. can be converted to their corresponding primary mercaptans. It is not essential, however, that the hydrocarbon employed be one which has an olefinic linkage at a terminal carbon atom. The olefinic linkage may be present within the hydrocarbon chain, such as in butene-2, hexene-3, cyclohexene, or in other secondary olefins. As has been indicated, the carbon atom to which the olefinic linkage is attached may have other hydrocarbon substituents attached thereto, e. g. isobutene, styrene, alpha-methyl styrene, etc. Olefins obtained from the synthol process or similar processes in which carbon monoxide and hydrogen are converted usually over an iron catalyst to a mixture of olefins and chemicals may suitably be employed after removal of oxygenated compounds therefrom.

The reaction is carried out in the presence of a promoter which consists of water. Distilled water, tap water or potable water can be used. Amounts such as 0.01 mol of water per mol of hydrocarbon can be employed, and the amounts may be as much as 10 mols of water per mol of hydrocarbon or greater if desired. Excellent results are obtained when the promoter water is employed in the amount of about 0.1 to 1 mol per mol of hydrocarbon. The manner in which the water functions is unknown. It has the repeatedly demonstrated advantage of increasing the extent of conversion of the hydrocarbon to a sulfur-containing product and also affects the direction of the reaction, i. e. it causes the formation of greater amounts of mercaptan and reduces the yields of sulfide. For the latter reason it increases the selectivity of the reaction to produce primary mercaptans from alpha-olefins rather than producing large amounts of organic sulfides therefrom. The use of water as the promoter is highly beneficial when the reaction is carried out in a ferrous metal reactor such as a carbon steel reactor or a stainless steel reactor particularly those which are not new reactors or which have not been passivated with nitric acid or similar materials to reduce the attack of acids upon the metal.

The pH of the water also has an effect upon the action of the water promoter. When acidic water is used, it produces a greater degree of conversion than if basic water were employed. Thus, water having a pH of less than 7, e. g. a pH of 1-3 may advantageously be employed, although even higher concentrations of hydrogen ions in the water may be present.

A number of experiments were carried out which demonstrate the promotional effect upon the reaction when water is present in the reaction zone. The experimental procedure followed consisted of flushing the stainless steel bomb with an inert gas to free it of oxygen, evacuating the bomb, introducing the free radical initiating agent into the bomb (and water when it was employed in the particular runs) followed by introducing the olefin and then the hydrogen sulfide into the bomb reactor. Thereafter the bomb was heated to the reactant temperature, viz. 90° C. when the catalyst was alpha-alpha'-azodiisobutyronitrile and 120° C. when di-tertiarybutyl peroxide was employed, for a reaction time of 18 hours. Sufficient pressure was employed to maintain $H_2S$ and olefin in the liquid phase, e. g. approximately 1,200 p. s. i. g. when propylene was employed. The results obtained with respect to formation of mercaptan and sulfide are shown in Table I which follows:

Table I

| Run No. | 1 | 2 | 3 | 4 |
|---|---|---|---|---|
| Charge (mols): | | | | |
| Propene | 6.2 | 6.5 | 2.98 | 2.98 |
| Hexene-1 | 13.4 | 13.3 | 11.2 | 11.2 |
| $H_2S$ | | | 2.78 | 2.78 |
| $H_2O$ | | | | |
| Alpha,alpha'-azodiisobutyronitrile | .012 | .012 | | |
| Di-tertiarybutyl peroxide | | | .014 | .014 |
| Yields [1]: | | | | |
| Mercaptan | 12.7 | 31.4 | 26 | 43 |
| Sulfide | 8.0 | 13.2 | 35 | 20 |
| Mercaptan/Sulfide Ratio | 3.2 | 4.7 | .75 | 2.1 |

[1] Mol percent based on hydrocarbon charge.

The increase in the yield of products and the improvement in the mercaptan/organic sulfide ratio which are caused by employing water as a promoter for the reaction are obvious from the above data.

Another series of runs was carried out in the same manner as was previously described, but employing varying amounts of water in the reaction zone. Di-tertiarybutyl peroxide was employed as the free radical initiating catalyst in the amount of 0.068 mol, a reaction time of 18 hours and a reaction temperature of approximately 115–120° C. was used. The results obtained follow in Table II:

Table II

| Run No. | 5 | 6 | 7 | 8 | 9 |
|---|---|---|---|---|---|
| Charge (mols): | | | | | |
| Propene | 4.5 | 3.65 | 4.5 | 3.85 | 4.3 |
| $H_2S$ | 17.4 | 12.5 | 18.4 | 15.1 | 15.5 |
| Water | | 1.1 | 2.78 | 11.1 | 16.7 |
| $H_2O$/Olefin Ratio | | 0.3 | 0.6 | 2.9 | 3.9 |
| Yields [1]: | | | | | |
| 1-Propanethiol | 22 | 43 | 47 | 42 | 38 |
| Di-n-propyl Sulfide | 37 | 19 | 25 | 26 | 21 |
| Mercaptan/Sulfide Ratio | 0.6 | 2.2 | 1.9 | 1.6 | 1.8 |

[1] Mol percent based on $C_3$—charge.

Similar advantages have been obtained when approximately 0.08 mol of water per mol of hydrocarbon and less were employed in the reaction zone.

In other series of runs, which were carried out in the manner previously described, the pH of the water was varied. In these experiments approximately 0.015 mol of di-tertiarybutyl peroxide was employed. A reaction temperature of approximately 115° C., a reaction time of about 18 hours, and a final reaction pressure of approximately 1,000 p. s. i. g. were used. In run No. 10 the initial pH was 12.2 and was obtained by adding $Na_2S$ to the water. In run No. 11 the initial pH of the water was 1.1 which was achieved by adding HCl to the water. The results obtained are shown in Table III which follows:

Table III

| Run No. | 10 | 11 |
|---|---|---|
| Charge (mols): | | |
| Propene | 7.25 | 8.3 |
| $H_2S$ | 10.3 | 11.5 |
| Water | 3.0 | 3.0 |
| pH of water | 12.2 | 1.1 |
| Yields [1]: | | |
| Mercaptan | 31 | 42 |
| Sulfide | 20 | 27 |
| Mercaptan/Sulfide Ratio | 1.56 | 1.50 |

[1] Mol percent based upon hydrocarbon charge.

It is evident from the above data that by maintaining a pH lower than 7 and preferably a very high concentration of hydrogen ions in the water, a co-promotional effect between the water and the hydrogen ions on the reaction is observed. This co-promotional effect does not appear to change the direction or selectivity of the reaction since essentially the same molar ratio of mercaptan to organic sulfide in the product is observed.

Another series of runs was performed in which various hydrocarbons containing olefinic linkages were used. These experiments were carried out in essentially the same manner as that employed in the previous runs. A reaction time of approximately 18 hours, a reaction temperature of about 115–120° C., and a final pressure in the reaction zone of approximately 1,000 p. s. i. g. were employed. The results obtained in this series of runs are shown in Table IV which follows:

*Table IV*

| Run No. | 12 | 13 | 14 | 15 | 16 | 17 | 18 |
|---|---|---|---|---|---|---|---|
| Hydrocarbon | Propene | Hexene-1 | Iso-butene | Butene-2 | α-Methyl styrene | Cyclo-hexene | Dodec-ene-1 |
| Charge (mols): | | | | | | | |
| Hydrocarbon | 5.1 | 2.98 | 2.72 | 2.72 | 1.95 | 1.82 | .59 |
| $H_2S$ | 16.1 | 11.2 | 12.4 | 11.9 | 13.1 | 15.4 | 12.1 |
| Water | 2.78 | 2.78 | 2.78 | 2.78 | 2.78 | 2.78 | 2.78 |
| Di-tert-butyl Peroxide | .013 | .013 | .013 | .013 | .013 | .021 | .02 |
| Yields [1] | | | | | | | |
| Mercaptan | 56 | 52 | 62 | 17 | 29 | 41 | 67 |
| Sulfide | 18 | 24 | 8 | 3 | 2 | ---------- | 19 |
| Mercaptan/Sulfide ratio | 3.1 | 2.2 | 7.8 | 5.7 | 14.5 | ---------- | 3.5 |

[1] Mol percent based on hydrocarbon charge.

It is evident from the above results that excellent conversion of the olefinic compound to its corresponding mercaptan, together with some yield of organic sulfide, is obtained.

While the invention has been described in connection with examples wherein the olefinic linkage between the carbon atoms is present in a hydrocarbon, it is apparent that other functional groups may also be present in the hydrocarbon, and that compounds such as acrylonitrile, vinyl acetate and the like can advantageously be converted to their corresponding mercaptans by means of this invention. These and other modifications will be apparent from the described invention to those skilled in this art.

We claim:

1. In the free radical catalyzed reaction of hydrogen sulfide with a hydrocarbon having an olefinic linkage, the improvement which comprises effecting said reaction in the presence of water in an amount sufficient to promote the reaction.

2. The process of claim 1 in which said water is present in an amount between about 0.1 to 1 mol per mol of said hydrocarbon.

3. The process of claim 1 in which said water is present in an amount between about 0.1 and 1 mol per mol of said hydrocarbon.

4. The process of claim 1 in which said water has a pH of less than 7.

5. The process of claim 1 in which said hydrocarbon has an olefinic linkage at a terminal carbon atom.

6. The process of claim 1 in which said hydrocarbon is a straight chain alpha-olefin.

7. The process of claim 1 in which the reaction is carried out in a ferrous metal reactor.

8. In the process of preparing primary mercaptans wherein hydrogen sulfide is contacted with a hydrocarbon having an olefinic linkage at its terminal carbon atom in the presence of a free radical catalytic agent for said reaction under conditions to cause addition of the hydrogen sulfide across the olefinic linkage, said hydrogen sulfide being employed in an amount in excess of one mol per mol of hydrocarbon, the improvement which comprises effecting said contacting in the presence of a promotional amount of water for the reaction consisting of between about .01 to 1 mol of water per mol of said hydrocarbon.

9. The process of claim 8 wherein the free radical catalytic agent is di-tertiarybutyl peroxide.

10. The process of claim 8 wherein the free radical initiating agent is alpha-alpha'-azodiisobutyronitrile.

References Cited in the file of this patent

UNITED STATES PATENTS

| 2,522,512 | Harman et al. | Sept. 19, 1950 |
| 2,522,590 | Vaughan et al. | Sept. 19, 1950 |

FOREIGN PATENTS

| 462,856 | Canada | Jan. 31, 1950 |

UNITED STATES PATENT OFFICE

CERTIFICATE OF CORRECTION

Patent No. 2,865,965 December 23, 1958

Paul D. May et al.

It is hereby certified that error appears in the printed specification of the above numbered patent requiring correction and that the said Letters Patent should read as corrected below.

Column 1, line 54, for "places" read -- place --; column 5, line 44, for "between about 0.1 to 1 mol" read -- of at least about 0.01 mols --.

Signed and sealed this 14th day of April 1959.

(SEAL)
Attest:

KARL H. AXLINE
Attesting Officer

ROBERT C. WATSON
Commissioner of Patents